United States Patent [19]

Hasegawa

[11] Patent Number: 4,730,688
[45] Date of Patent: Mar. 15, 1988

[54] STEERING SYSTEM FOR WHEELED VEHICLE

[75] Inventor: Akira Hasegawa, Toyota, Japan

[73] Assignee: Toyota Jidosha Kabushiki Kaisha, Japan

[21] Appl. No.: 922,469

[22] Filed: Oct. 23, 1986

[30] Foreign Application Priority Data

Oct. 24, 1985 [JP] Japan .............................. 60-163476[U]

[51] Int. Cl.$^4$ ............................................... B62D 5/06
[52] U.S. Cl. .................................... 180/148; 180/141; 180/132
[58] Field of Search ............... 180/148, 132, 141, 154; 280/89, 90; 74/388 PS

[56] References Cited

U.S. PATENT DOCUMENTS 2,047,059  7/1936  Clark ........................................ 280/90
4,492,283  1/1985  Bertin ...................................... 180/148
4,546,839  10/1985  Noguchi ................................... 180/143

Primary Examiner—John J. Love
Assistant Examiner—Donn McGiehan
Attorney, Agent, or Firm—Parkhurst & Oliff

[57] ABSTRACT

A steering system for a wheeled vehicle having a steering linkage including a rack bar arranged between a pair of digirible road wheels to steer the road wheels in accordance with the driver's steering effort applied thereto, which comprises a lateral rod operatively connected in parallel with the rack bar for displacement therewith, and a single pneumatic cylinder arranged perpendicularly to the lateral rod and having a piston contained therein and a piston rod extending outwardly from the piston and being operatively connected to the lateral rod in such a manner that the piston is located in a stroke end and when the lateral rod is in a neutral position and that the piston rod is pulled in accordance with displacement of the lateral rod to increase an internal pressure in the pneumatic cylinder. The internal pressure in the pneumatic cylinder acts on the rack bar through the lateral rod as a reaction force against the driver's steering effort.

5 Claims, 7 Drawing Figures

STEERING SYSTEM FOR WHEELED VEHICLE

BACKGROUND OF THE INVENTION

1. Field of the Invention

The present invention relates to a steering system for wheeled vehicles, and more particularly to a steering system provided with a mechanism for preventing shimmy or flutter acting on the steering wheel of the vehicle.

2. Discussion of the Background

In Japanese Utility Model Early Publication No. 59-169263, there has been proposed a steering system wherein tie rods of the steering linkage are provided with weight elements by way of resilient members for dampening vibration acting thereon. In Japanese Utility Model Early Publication No. 57-97764, there has been proposed a steering system wherein the steering linkage is provided with a single steering damper which is arranged along a steering rack bar to absorb vibration acting thereon through the rack bar. In such steering systems as described above, however, smooth return movement of the steering wheel to its neutral position may not be effected due to relatively large frictional resistance in the gear box and additional resistance caused by the weight elements or the steering damper.

SUMMARY OF THE INVENTION

It is, therefore, a primary object of the present invention to provide an improved steering system capable of preventing shimmy or flutter acting on the steering wheel and of effecting smooth return movement of the steering wheel to its neutral position.

Another object of the present invention is to provide an improved steering system, having the above-described characteristics, capable of ensuring stable operation of the steering wheel during high speed travel of the vehicle.

According to the present invention, the objects are attained by providing a steering system for a wheeled vehicle having a steering linkage arranged between a pair of digirible road wheels to steer the road wheels in accordance with the driver's steering effort applied thereto, which comprises a lateral rod operatively connected with the steering linkage for displacement therewith, and a single pneumatic cylinder arranged perpendicularly to the lateral rod and having a piston contained therein and a piston rod extending outwardly from the piston and being operatively connected to the lateral rod in such a manner that the piston is located in a stroke end when the lateral rod is in a neutral position and that the piston rod is pulled in accordance with displacement of the lateral rod to increase an internal pressure in the pneumatic cylinder. The internal pressure in the pneumatic cylinder acts on the steering linkage through the lateral rod as a reaction force against the driver's steering effort.

In a power-assisted steering system of the rack-and-pinion type, the steering linkage is in the form of a rack bar which is arranged to be assisted by a power cylinder associated therewith and is operatively connected at its opposite ends with the road wheels to steer the road wheels in accordance with the driver's steering effort applied thereto, and the lateral rod is connected in parallel with the rack bar for displacement therewith.

BRIEF DESCRIPTION OF THE DRAWINGS

Other objects, features and advantages of the present invention will become more readily apparent from the following detailed description of a preferred embodiment and certain modifications thereof when taken together with the accompanying drawings, in which.

DESCRIPTION OF THE PREFERRED EMBODIMENTS

Figure 1:
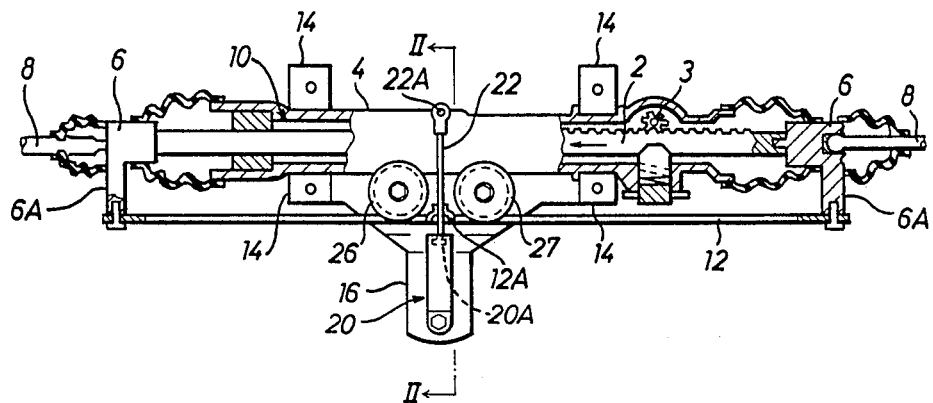
FIG. 1 is a plan view, partially in cross-section, of a power-assisted steering system in accordance with the present invention.
Figure 2:
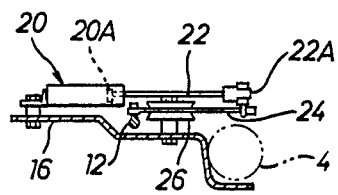
FIG. 2 is a cross-sectional view taken along line II—II in FIG. 1.

Referring now to the drawings, FIGS. 1 and 2 illustrate a power-assisted steering system of the rack-and-pinion type in accordance with the present invention. The steering system includes a lateral tubular housing 4 carried by a stationary support member 16, a hydraulic power cylinder 10 provided within the tubular housing 4, a rack bar 2 integral with a piston (not shown) in the power cylinder 10, and a pinion shaft 3 rotatably mounted on the tubular housing 4 to be applied with the driver's steering effort and being in mesh with the rack bar 2. The stationary support member 16 has two pairs of laterally spaced brackets 14 which are secured to a body structure of the vehicle. The rack bar 2 is connected at the opposite ends thereof with a pair of tie rods 8 by means of ball joints 6. The tie rods 8 each are connected in a usual manner with a knuckle arm (not shown) of a front digirible road wheel of the vehicle. In operation, the pinion shaft 3 is rotated by the driver's steering effort applied thereto through a steering shaft assembly (not shown), and in turn, the rack bar 2 is axially displaced by rotation of the pinion shaft 3. Simultaneously, the power cylinder 10 is activated under control of a changeover valve (not shown) associated with the pinion shaft 3 to assist the axial displacement of rack bar 2. Thus, the pair of front digirible road wheels of the vehicle are steered in accordance with the axial displacement of rack bar 2.

In the above arrangement of the power-assisted steering system, a horizontal lateral rod 12 is carried by a pair of arms 6A which are integrally formed with the ball joints 6, respectively. Thus, the horizontal lateral rod 12 is arranged in parallel with the rack bar 2 for displacement therewith and is located above the support member 16. A pneumatic cylinder 20 such as a gas cylinder is arranged perpendicularly to the lateral rod 12 and fixedly mounted on the support member 16. The pneumatic cylinder 20 has a piston 20A contained therein and a piston rod 22 extending from the piston 20A outwardly across over the lateral rod 12 and arranged in a fore-and-aft direction of the vehicle. As shown in FIG. 2, the piston rod 22 of pneumatic cylinder 20 has an outer end 22A which is connected to the center of horizontal lateral rod 12 by means of a flexible cable 24. Arranged at the both sides of piston rod 22 are a pair of guide pulleys 26 and 27 which are rotatably mounted on the support member 16 to be engaged with the flexible cable 24. The pneumatic cylinder 20 is filled with compressible gas such as air in such a manner that the piston 20A is located in an outward stroke end when the rack bar 2 is in a neutral position.

Figure 3:
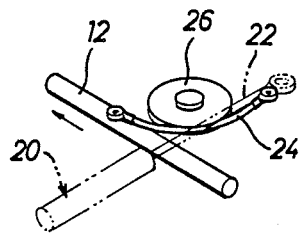
FIG. 3 is a schematic perspective view illustrating an arrangement of a flexible cable connected to a pneumatic cylinder and a horizontal lateral rod shown in FIG. 1.
Figure 4A:
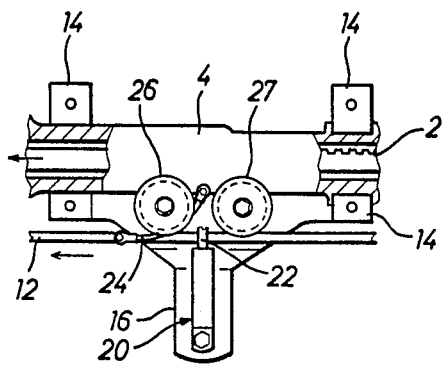
FIGS. 4 (a) and (b) each are a plan view illustrating operation of the pneumatic cylinder shown in FIG. 1.

Assuming that the pinion shaft 3 is rotated clockwisely by the driver's steering effort applied thereto, the rack bar 2 is displaced leftwards by rotation of the pinion shaft 3, and simultaneously the power cylinder 10 is activated under control of the associated changeover valve to assist the leftward displacement of rack bar 2. In this instance, the horizontal lateral rod 12 is displaced leftwards with the rack bar 2 so that the piston rod 22 is pulled by the flexible cable 24 and pressed into the pneumatic cylinder 20. As a result, an internal pressure in pneumatic cylinder 20 increases in accordance with the leftward displacement of lateral rod 12 and acts on the lateral rod 12 as a reaction force against the assist power of power cylinder 10. (see FIGS. 3 and 4(a))

Figure 4B:
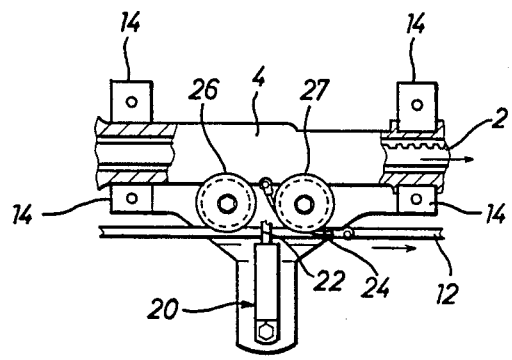

When the pinion shaft 3 is rotated counterclockwisely by the driver's steering effort applied thereto, the rack bar 2 is displaced rightwards by rotation of the pinion shaft 3, and simultaneously the power cylinder 10 is activated under control of the associated changeover valve to assist the rightward displacement of rack bar 2. In this instance, the horizontal lateral rod 12 is displaced rightwards with the rack bar 2 so that the piston rod 22 is pulled by the flexible cable 24 and pressed into the pneumatic cylinder 20. As a result, the internal pressure in pneumatic cylinder 20 increases in accordance with the rightward displacement of lateral rod 12 and acts on the lateral rod 12 as a reaction force against the assist power of power cylinder 10. (see FIG. 4(b))

In such operation of the steering system as described above, the pneumatic cylinder 20 is effective to absorb vibration acting on the rack bar 2 thereby to prevent shimmy or flutter acting on the steering wheel. Furthermore, the reaction force acting on lateral rod 12 increases in accordance with an increase of the steering amount of the steering wheel. This is effective to ensure stable operation of the steering wheel during high speed travel of the vehicle and to ensure smooth return movement of the steering wheel to its neutral position.

Figure 5:
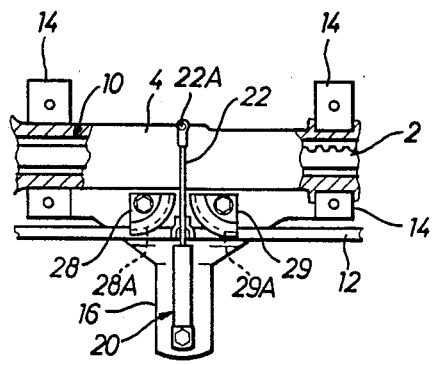
FIG. 5 is a plan view, partially in cross-section, of a modification of the steering system shown in FIG. 1.

Although in the above embodiment the pneumatic cylinder 20 is arranged in a horizontal direction, it may be arranged in a vertical direction relative to the horizontal lateral rod 12. In addition, as shown in FIG. 5, the guide pulleys 26 and 27 in the above embodiment may be replaced with a pair of guide members 28 and 29 which are formed with semicircular guide groves 28A and 29A.

Figure 6:
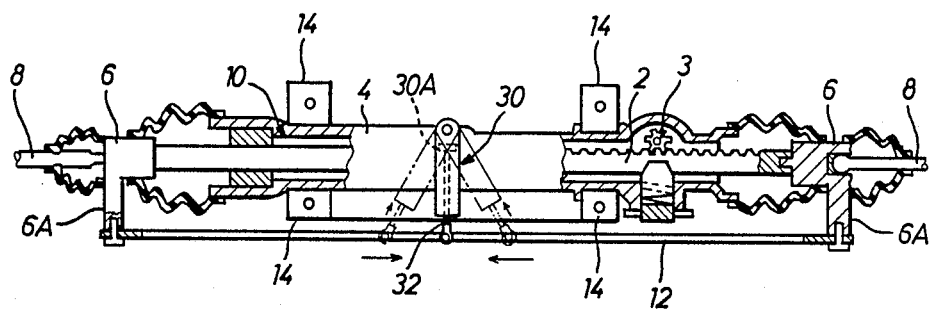
FIG. 6 is a plan view, partially in cross-section, of another modification of the power-assisted steering system.

In FIG. 6, there is illustrated another modification of the power-assisted steering system, wherein the pneumatic cylinder 20 is replaced with a pneumatic cylinder 30 which is rotatably mounted on a portion of the tubular housing 4. The pneumatic cylinder 30 is arranged perpendicularly to the horizontal lateral rod 12 and has a piston 30A contained therein and a piston rod 32 extending outwardly from the piston 30A and being connected with the center of horizontal lateral rod 12. The pneumatic cylinder 30 is filled with compressible gas such as air in such a manner that the piston 30A is located in an inward stroke end when the rack bar 2 is in the neutral position. Other construction of the modification is substantially the same as that of the steering system shown in FIG. 1.

In operation of the modification, the pneumatic cylinder 30 is swung by leftward or rightward displacement of the horizontal lateral rod 12 so that the piston rod 32 is pulled outwardly to increase an internal pressure in pneumatic cylinder 30. As a result, the internal pressure in pneumatic cylinder 30 acts on the lateral rod 12 as a reaction force against the assist power of power cylinder 10.

Although in the above-described embodiment and modifications the present invention has been adapted to a power-assisted steering system of the rack-and-pinion type, it is to be noted that the present invention may be adapted to a steering system of the other type such as the Haltenberger type, symmetrical link type, or center arm type and also may be adapted to a manual steering system.

What is claimed is:

1. A steering system for a wheeled vehicle having a steering linkage in the form of a rack bar in a power assisted steering system of the rack and pinion type, said rack bar being arranged to be assisted by a power cylinder associated therewith and being operatively connected at its opposite ends with a pair of dirigible road wheels to steer the road wheels in accordance with a driver's steering effort applied thereto, comprising:
   a lateral rod operatively connected in parallel with said rack bar for displacement therewith; and
   a single pneumatic cylinder arranged perpendicularly to said lateral rod and having a piston contained therein and a piston rod extending outwardly from said piston and being operatively connected to said lateral rod in such a manner that said piston is located in a stroke end when said lateral rod is in a neutral position and that said piston rod is moved in accordance with displacement of said lateral rod to increase an internal pressure in said pneumatic cylinder, whereby the internal pressure in said pneumatic cylinder acts on said lateral rod as a reaction force against the driver's steering effort.

2. A steering system as claimed in claim 1, wherein said pneumatic cylinder is fixedly mounted on a stationary support member secured to a body structure of the vehicle, and the piston rod of said pneumatic cylinder has an outer end connected with said lateral rod by means of a flexible cable, and wherein a pair of guide members are mounted on said stationary support member at the both sides of said piston rod to be engaged with said flexible cable when said lateral rod is axially displaced.

3. A steering system as claimed in claim 1, wherein said pneumatic cylinder is rotatably mounted on a tubular housing of said rack bar, and the piston rod of said pneumatic cylinder has an outer end connected with said lateral rod.

4. A steering system for a wheeled vehicle having a steering linkage arranged between a pair of dirigible road wheels to steer the road wheels in accordance with the driver's steering effort applied thereto, comprising:
   a lateral rod operatively connected with said steering linkage for displacement therewith; and
   a single pneumatic cylinder arranged perpendicularly to said lateral rod and having a piston contained therein and a piston rod extending outwardly from said piston and being operatively connected to said lateral rod in such a manner that said piston is located in a stroke end when said lateral rod is in a neutral position and that said piston rod is pulled in accordance with displacement of said lateral rod to increase an internal pressure in said pneumatic cylinder in direct relation to said lateral rod displacement, whereby the internal pressure in said pneumatic cylinder acts on said lateral rod as a reaction force against the driver's steering effort.

5. A steering system for a wheeled vehicle having a steering linkage arranged between a pair of dirigible road wheels to steer the road wheels in accordance with the driver's steering effort applied thereto, comprising:

a lateral rod operatively connected with said steering linkage for displacement therewith; and a single pneumatic cylinder arranged perpendicularly to said lateral rod and having a piston contained therein and a piston rod extending outwardly from said piston and being operatively connected to said lateral rod in such a manner that said piston is located in a stroke end when said lateral rod is in a neutral position and that said piston rod is pulled in accordance with displacement of said lateral rod to increase an internal pressure in said pneumatic cylinder, whereby the internal pressure in said pneumatic cylinder acts on said lateral rod as a stabilizing reaction force against the driver's steering effort.

* * * * *